United States Patent
Lang

(10) Patent No.: US 11,447,166 B2
(45) Date of Patent: Sep. 20, 2022

(54) RAILWAY TRACK CONDITION MONITORING SYSTEM FOR DETECTING A PARTIAL OR COMPLETE DISRUPTION OF A RAIL OF THE RAILWAY TRACK

(71) Applicant: WAVETRAIN SYSTEMS AS, Lysaker (NO)

(72) Inventor: Dominik Lang, Oslo (NO)

(73) Assignee: WAVETRAIN SYSTEMS AS, Lysaker (NO)

( * ) Notice: Subject to any disclaimer, the term of this patent is extended or adjusted under 35 U.S.C. 154(b) by 537 days.

(21) Appl. No.: 16/330,914

(22) PCT Filed: Sep. 6, 2017

(86) PCT No.: PCT/NO2017/050218
§ 371 (c)(1),
(2) Date: Mar. 6, 2019

(87) PCT Pub. No.: WO2018/048308
PCT Pub. Date: Mar. 15, 2018

(65) Prior Publication Data
US 2019/0232988 A1    Aug. 1, 2019

(30) Foreign Application Priority Data

Sep. 7, 2016 (NO) .................................. 20161424

(51) Int. Cl.
*B61K 9/10* (2006.01)
*B61L 27/70* (2022.01)
(Continued)

(52) U.S. Cl.
CPC .............. *B61L 23/044* (2013.01); *B61K 9/10* (2013.01); *B61L 15/0072* (2013.01);
(Continued)

(58) Field of Classification Search
CPC ..................................................... B61L 23/044
See application file for complete search history.

(56) References Cited

U.S. PATENT DOCUMENTS 5,743,495 A * 4/1998 Welles, II ............. B61L 23/047
246/169 R
6,951,132 B2    10/2005 Davenport et al.
(Continued)

FOREIGN PATENT DOCUMENTS

| CN | 101607565 A | 12/2009 |
| CN | 101813666 A | 8/2010 |

(Continued)

OTHER PUBLICATIONS

International Search Report, issued in PCT/NO2017/050218, PCT/ISA/210, dated Nov. 27, 2017.
(Continued)

*Primary Examiner* — Joseph H Feild
*Assistant Examiner* — Pameshanand Mahase
(74) *Attorney, Agent, or Firm* — Birch, Stewart, Kolasch & Birch, LLP

(57) ABSTRACT

A railway track condition monitoring system including a plurality of sensors installed on a rail of the track and spaced by a predetermined distance from each other. The sensors having respective signal acquisition and recording means for the acquisition and recording of an acoustic signal being generated by an approaching train and propagated by the rail or by a ground carrying the rail. A signal transfer means for the transfer of an acquired and recorded signal to the passing train by wireless transfer at the time of passing of the train in proximity to sensors, and a signal analyzing means for analysing transferred ones of the acquired and recorded signal on-board the passing train. The signal analyzing means may be adapted to compare in a processing unit the (Continued)

signals from adjacent sensors and on that basis indicate a rail discontinuity.

10 Claims, 6 Drawing Sheets

(51) Int. Cl.
    *G01H 1/00* (2006.01)
    *G08B 21/18* (2006.01)
    *B61L 1/06* (2006.01)
    *B61L 23/04* (2006.01)
    *B61L 15/00* (2006.01)
    *B61L 25/02* (2006.01)

(52) U.S. Cl.
    CPC ............. *B61L 25/025* (2013.01); *B61L 27/70* (2022.01); *G01H 1/00* (2013.01); *G08B 21/18* (2013.01); *B61L 2205/02* (2013.01)

(56) References Cited

U.S. PATENT DOCUMENTS

| | | | |
|---|---|---|---|
| 2003/0187605 A1* | 10/2003 | Mathews, Jr. ........... | B61K 9/04 702/134 |
| 2004/0261533 A1* | 12/2004 | Davenport ............ | B61L 23/044 73/659 |
| 2006/0076461 A1* | 4/2006 | DeRose ................... | B61K 9/00 246/122 R |
| 2008/0106973 A1* | 5/2008 | Maisons ................. | G01V 1/40 367/25 |
| 2014/0129154 A1 | 5/2014 | Cooper et al. | |
| 2015/0033864 A1 | 2/2015 | Kumar et al. | |
| 2015/0285927 A1 | 10/2015 | Nedilko et al. | |

FOREIGN PATENT DOCUMENTS

| | | | | |
|---|---|---|---|---|
| CN | 102530028 A | 7/2012 | | |
| CN | 103298679 A | 9/2013 | | |
| CN | 203348923 U | 12/2013 | | |
| DE | 19946227 C1 | 5/2001 | | |
| DE | 10 2011 084 160 | * 10/2011 | ............... | B61K 9/10 |
| DE | 102011084160 A1 | 4/2013 | | |
| JP | 2002-104193 A | 4/2002 | | |
| JP | 2015-34452 A | 2/2015 | | |
| JP | 2015-102329 A | 6/2015 | | |
| WO | WO 2008/093169 A2 | 8/2008 | | |
| WO | WO 2013/050244 A1 | 4/2013 | | |
| WO | WO 2014/027977 A1 | 2/2014 | | |

OTHER PUBLICATIONS

Search Report issued in NO application No. 20161424, dated Mar. 7, 2017.
Written Opinion of the International Searching Authority, issued in PCT/NO2017/050218, PCT/ISA/237, dated Nov. 27, 2017.
International Preliminary Report on Patentability, issued in PCT/NO2017/050218, PCT/IPEA/409, dated Oct. 30, 2018.
Chinese Office Action and Search Report dated Sep. 27, 2020 for Application No. 201780067245.8 with an English translation of the Office Action.
Feng et al., "Research on Structural Damage Localization methods Based on Cross-Correlation Function Amplitude Vectors", vol. 25, No. 3, Jul. 2006, pp. 77-80 (English translation 14 pages).
India_First_Examination_Report_201927013880—dated Sep. 1, 2021; pp. 1-6.
KR_Notice_of_Preliminary_Rejection_1020197009860—dated Dec. 1, 2021; pp. 1-9.

* cited by examiner

| | S1 | S2 | S3 | S4 | S5 |
|---|---|---|---|---|---|
| S1 | 1 | 0.9974 | 0.9972 | 0.9974 | 0.9971 |
| S2 | 0.9974 | 1 | 0.9973 | 0.9971 | 0.9969 |
| S3 | 0.9972 | 0.9973 | 1 | 0.9966 | 0.9969 |
| S4 | 0.9974 | 0.9971 | 0.9966 | 1 | 0.9969 |
| S5 | 0.9971 | 0.9969 | 0.9969 | 0.9969 | 1 |

RAILWAY TRACK CONDITION MONITORING SYSTEM FOR DETECTING A PARTIAL OR COMPLETE DISRUPTION OF A RAIL OF THE RAILWAY TRACK

FIELD OF INVENTION

The present invention relates to a railway track monitoring system for detecting a partial or complete disruption of a rail of the railway track, which can help railroad authorities or railroad operators to continuously monitor the rail tracks on potential breaks in the rails.

BACKGROUND

The continuous evolution or abrupt occurrence of fractures in rail profiles used for railway tracks is considered as a severe problem as it may cause, in the most extreme cases, the derailment of trains and railway vehicles, and hence leads to both human and financial losses. Especially during winter months and extreme low temperatures, broken rails occur more often. The low temperatures lead to shrinking of the steel profiles which, in the most severe cases, ends in the complete disruption of the rails.

The herein proposed surveillance procedure is targeting the partial or complete disruption of the rails (i.e., larger cracks that run through the entire profile and hence lead to a complete separation of the rail) in a semi-continuous (near-real-time) mode. The proposed procedure is not intended to identify small fractures (fissures, hairline cracks) that are slowly developing in the rails and which do not represent a severe threat to railroad safety. The causes for small fractures in the steel profiles of railway tracks can be manifold, e.g., mechanical degeneration (abrasion) due to operation, chemical erosion. However, the complete separation of the rails (known as 'broken rails' effect) may not only be the long-term result of these impacts, but also the sudden effect caused by temperature variations (thermomechanical shrinkage/dilatation of materials)
    defective welding seams/joints
    vandalism, sabotage
    other impacts (e.g., rockfalls, accidents).

The herein proposed procedure shall not substitute existing inspection procedures but more complement those and simply contribute additional safety to railroad traffic.

According to Norsk Jernbaneverkets Teknisk Regelverk (JBV-TR), procedures exist to inspect and investigate railway tracks with respect to the existence of fissures and fractures. As far as it can be taken from the JBV-TR, two inspection types are mainly in practice:
visual inspection (a),
ultrasound control (b).

As visual inspections (a) do only provide a certain level of accuracy, are highly biased, subjective, and, if conducted regularly for an entire railway network, will be highly ineffective as well as cost-consuming, a more technical procedure conducted in a more automated operation mode may be preferable. However, no information is provided in JBV-TR on the effectivity and reliability of existing monitoring procedures based on ultrasound control (b). Based on personal communication with Norway's Jernbaneverket (JBV), each segment of Norway's railroad network is inspected once per year on average (some segments more often, other segments less frequent) by, the ultrasound trolley (ultralydtralle).

What becomes clear, however, is the fact that neither of both inspection methods can be applied in a continuous mode, hence reducing the chance to identify cracks or broken segments immediately after their occurrence. [Pers. Comm. with Frode Teigen (JBV): "viktig å få beskjed umiddelbart skinnebrudd har skjedd".]

In addition, a broken rail may be identified if the electric current circuit (strømkrets) in the rails is interrupted. This, however, will not be possible anymore when ERTMS (European Rail Traffic Management System) has replaced the traditional standards for train control and command systems.

Also, only the more important segments of the rail network were/are equipped with current circuits.

FIG. 1 illustrates a prior art rail break detection solution disclosed in the publication with title "Elastic Wave Analysis for Broken rail detection", wherein a vibration or acoustic signal on the rail that is generated by a train moving on the rails and propagated from the train towards the rail break and the signal reflected back from the rail break towards the train is sensed by a sensor at a location between the train and the rail break, the detection of a rail break being made on basis of an increased amplitude of the total signal at the location of the sensor.

Other technical solutions involving track mounted sensors for monitoring or checking a railroad rack are disclosed in JP2015034452A, WO2013050244A1, and US2015285927A1. Other technical solutions for monitoring or checking a railroad rack are disclosed in US2015033864A1 and US2014129154A1.

In view of the weaknesses of existing inspection methodologies, the novel inspection system aims at solving at least one of the following problems:
    autonomous operation, possibly operated in an automated mode (hence cost-effective)
    objective assessment, i.e., not being dependent on the subjective opinion of the screener(s) but on empirical proof (i.e., by instrumental/experimental results)
    robustness, both with respect to the analysis procedure as well as the physical components (due to weathering effects etc.)
    redundancy, so that the functionality of the system is guaranteed even if certain components of the system (sensors, analysis units) are malfunctioning
    non-invasiveness, i.e., neither the physical components of the system nor its operation shall have any negative impact on the train traffic itself or any other existing installation
    adding safety, i.e., the system shall only provide additional safety, even in cases where the system is malfunctioning, risks connected with railroad safety are not increased.

SUMMARY OF THE INVENTION

The present invention provides a railway track condition monitoring system for detecting a partial or complete disruption of a rail of the railway track.

A railroad surveillance solution as disclosed herein, in a general configuration comprises
    a first phase, also referred to as the instrumentation phase, wherein both rails and trains are equipped with components of the rail surveillance system, wherein sensor units are attached to the rails, advantageously in equal or varying distance to each other, while receiver/processing units are carried by a single train, a few trains, or many trains, and a second phase, also referred to as the excitation and recording phase, wherein vibrations or acoustic waves that are generated by the train and travelling in the rails with a wave propagation velocity $V_{waves}$ greater than the train's velocity $V_{train}$, and any sensor located in the train's moving direction will be able to record wherein the incoming "wave trains", and wherein that the propagation medium, typically a standardized steel rail profile, between two sensors is uniform, that the surrounding conditions remain substantially stable, and that wave trains recorded at consecutive sensors will be highly correlated (irrespective of the time delay) is postulated, and in case of a broken rail, signals recorded by those sensors located beyond the broken rail segment will be significantly different and hence uncorrelated when compared with signals recorded at sensors being located ahead of the broken segment, and a third phase, also referred to as the data collection, data processing, and alerting phase, wherein the very same passing train equipped with a receiver unit picks up the recorded signal at each sensor, and the receiver/processing unit aboard the train compares/correlates data from consecutive sensors, and inconsistencies, which could be understood as uncorrelated signals between two sensors, are flagged and reported, or alerted, to the rail authority's operation center, TOCC.

In a first embodiment of the general configuration of the surveillance solution of above, it comprises sensor units for sensing acceleration of a rail of a track, the sensor units being attached to the rail, spaced with respect to each other. Advantageously, the sensor units are equidistantly spaced along the track. The inter-sensor distance of the spaced sensors units may vary along a given rail or from one installation to another, depending on factors affecting the track's regularity. Such factors could e.g. be curves, installations, bridges, and switches/turnouts. Both rails of a rail pair of a typical railroad track are advantageously equipped with sensors units. Each sensor unit is advantageously geographically tagged, allowing a potentially broken segment to be localized easily.

In an advantageous embodiment of the first embodiment of the general configuration of the surveillance solution of above comprising sensor units, the sensor units are force-fit tied to the outside foot of the rail profile so that no interference with the train wheels can occur. The fastening of the sensor unit to the rails may be done by glue or epoxy resin.

In an advantageous embodiment of the first embodiment of the general configuration of the surveillance solution of above comprising sensor units, the sensor unit could comprise at least one of
- a sensor including an acceleration or vibration sensor adapted to sense a time-dependent acceleration or vibration of the rail generated by an incoming train and propagated on the rail and to output a sensed acceleration or vibration signal, and a signal recording means adapted to make a recording of a sensed acceleration or vibration signal provided by the acceleration or vibration sensor, and
- a first processor comprising a processor means adapted to process the sensed acceleration or vibration signal of a recording for identifying a signal segment corresponding to a predetermined characteristic signal pattern, and
- a first data memory for saving the sensed data to a data file, first signal data representing an identified one of the signal segment, and
- a transmitter including a first wireless data communication means adapted to communicate wirelessly a saved one of said first signal data to a remotely located corresponding second wireless data communication means, and
- a battery for continuous supply of electric power to said sensor, first processor, first memory, and transmitter.

In an advantageous embodiment, the acceleration or vibration sensor comprises a sensor gain control circuit means arranged to control the gain or sensitivity of the acceleration or vibration sensor so as to operate the sensor in a noise limited sensing mode. In the noise limited sensing mode, at times when no acceleration or vibration from a train in motion is present in the rail at the position of the sensor unit, the level of a sensed acceleration or vibration signal output from the sensor is due to noise and is kept within a small fraction, preferably within 30%, more preferably within 15%, and even more preferably within 5%, of the full dynamic range of the acceleration or vibration signal output of the sensor. The sensor gain control circuit means is in one embodiment adapted to provide dynamic control of the sensor gain or sensitivity, while in another embodiment, it is adapted to maintain the sensor gain or sensitivity at a predetermined level that is either fixed or adjustable.

In an advantageous embodiment of the first embodiment of the general configuration of the surveillance solution of above comprising a receiver and processor unit aboard the train, the receiver and processor unit could comprise at least one of
- a locator adapted to determine a location of the train,
- at least one of the second wireless data communication means adapted to receive wirelessly said saved one of said first signal data from the first wireless data communication means of a sensor unit,
- a combiner adapted to associate a determined location of the train with a received one of said first signal data from a respective sensor unit,
- a second memory adapted to store a plurality of ones of said first signal data received from of a respective ones of a plurality of said sensor unit and associated ones of said determined locations of the train, and
- a second processor adapted to retrieve from the second memory and process a plurality of ones of said first signal data and to derive an indicator of a rail break at a location between locations of at least two of said sensor unit.

In an advantageous embodiment of the first embodiment of the general configuration of the surveillance solution of above comprising seismic sensor units, it is envisioned that the sensor units are designed as small as possible so as to avoid catching too much attention from persons walking by the tracks (and thereby being spoiled or vandalized) and to avoid offering open surface for being damaged by mechanical impacts (stones etc).

In a second embodiment of the general configuration of the surveillance solution of above, or in a further embodiment of the first embodiment of above, it comprises one or more receiver units being carried by a train, wherein the one or more receiver units is/are adapted to receive the data from one or more sensor units, to do data processing, and to forward status/alert messages to the train operation control center (TOCC).

In an advantageous embodiment of the second embodiment of the surveillance solution of above, or in a further embodiment of the first embodiment of above, the solution comprises one or more receiver units being carried by a train, wherein the one or more receiver units could advantageously comprise at least one of:

a powerful wireless data transmission device, such as i.e. a Bluetooth type device, which will pick up the data from each sensor while passing by, such as e.g. over a period of a few seconds available to do the handing over of the data file, and a processing unit, such as e.g. implemented by a microchip type processor, which comprises means for at least one of: unpacking the data file, comparing/correlating the data with data from previous/subsequent sensors, identifying the correlation coefficient, and sending a status message to the train operation control center, TOCC, such as e.g. using the train's GSM system, or storing geotagged information in a database, which geotagged information in a database is advantageously adapted to be handed over the TOCC once the train reached a major train station.

In a further embodiment of the second embodiment of the general configuration of the surveillance solution of above, or in a further embodiment of the first embodiment of above, on the solution's promptness to identify a broken rail, hence the safety level, is adapted to be decided by the amount of trains carrying the receiver units and how often these trains pass a certain rail track, thereby being enabled to pick up their own produced vibration or movement signals that are sensed at the sensor units.

In an advantageous embodiment of the first embodiment of the general configuration of the surveillance solution of above comprising seismic sensor units, signals from sub-groups of sensors are collected in a local track, from where they are transferred to the train, which would be different from a sensor individual transfer. It is contemplated that signals collected from sub-groups of sensors are compared in a local track unit, from where they are transferred to the train, allowing processing at the level of the track. It is further contemplated that sensor signals are analysed in a central command unit after being forward by the passing train, allowing processing to be done in other facility than in the train.

BRIEF DESCRIPTION OF THE DRAWINGS

In the following, the invention will be described by way of example and with reference to the accompanying drawings, in which

FIG. 6B shows one of the first wavetrains sensed with a very characteristic and homogenous waveform versus time.

FIG. 6C shows the rise phase of the sensed signal which is linearly increasing until it reaches a higher more stable amplitude level.

FIG. 6D illustrates the sensed signal after the train has long passed the recording sensor, which basically represents random noise and which is also observed before the first train-induced vibrations arrive at one sensor.

DETAILED DESCRIPTION OF THE INVENTION

In the following, a method for triggering recording an acceleration or vibration signal detected by the acceleration or vibration sensor is described, which method is also referred to herein as a signal detection algorithm for controlling when shall the recording of data be triggered.

Figure 1:
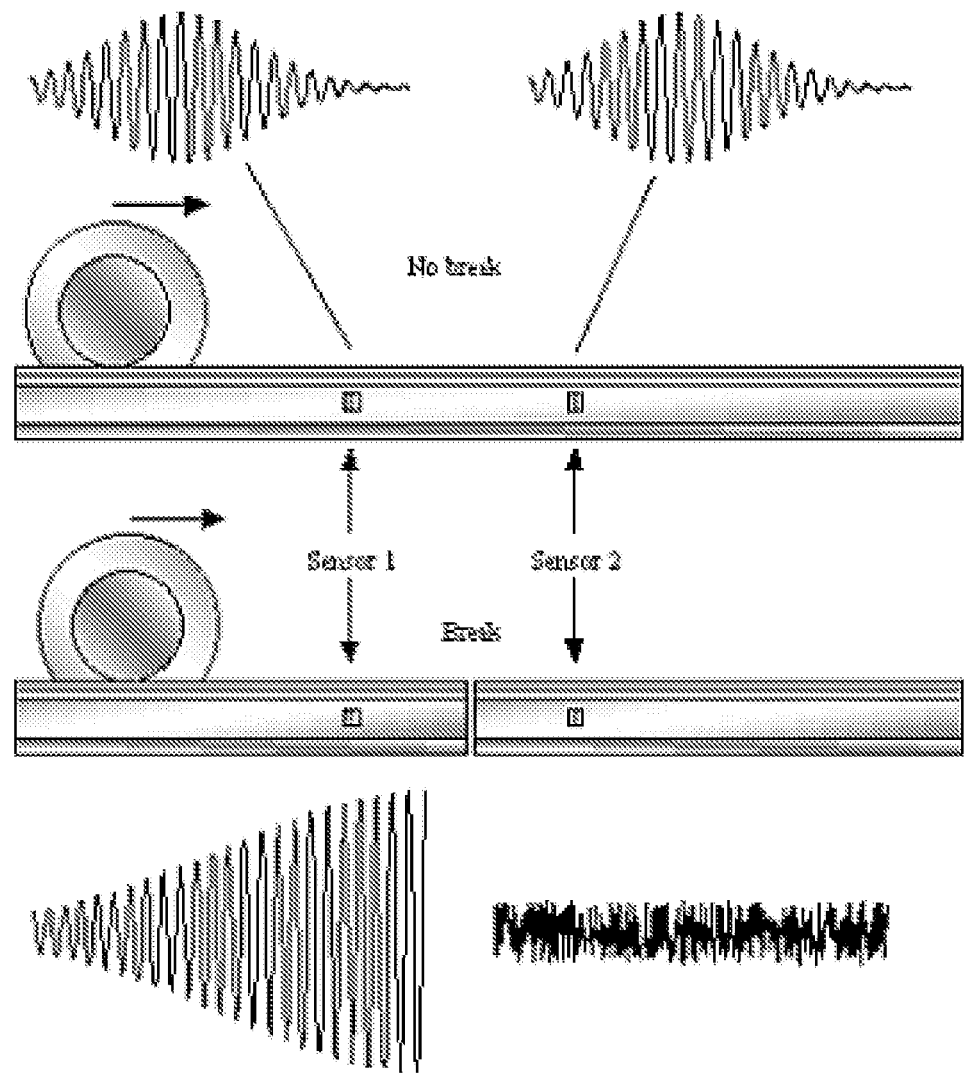
FIG. 1 is a schematic drawing illustrating a prior art rail break detection solution.
Figure 2:
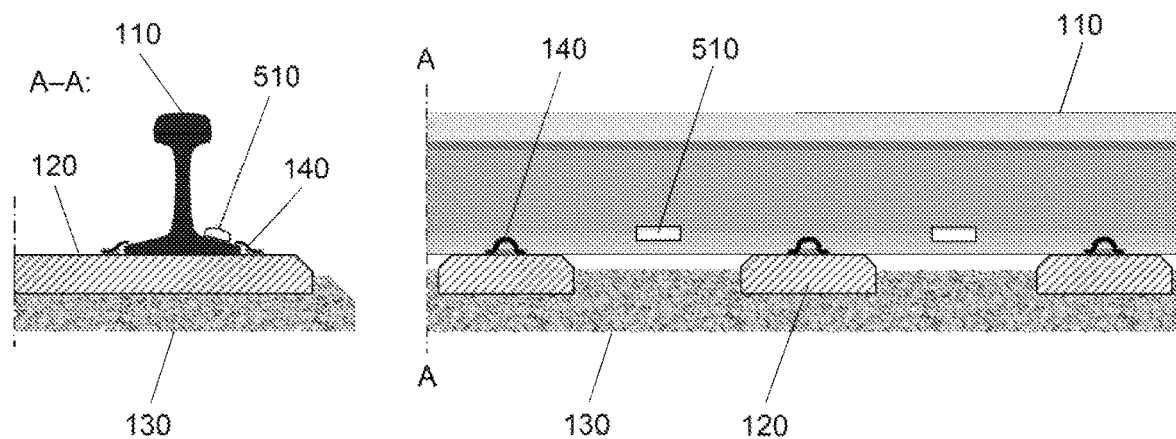
FIG. 2 is a schematic drawing illustrating details of a typical rail sensor to track installation. The sketch on the left illustrates the cross section of one rail profile (A-A) while the right sketch represents the side view of the rail track.
Figure 3:
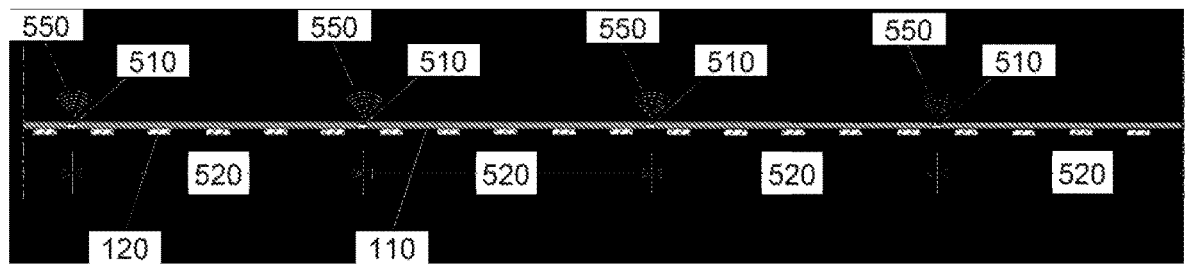
FIG. 3 shows details of a typical rail sensor installation along a section of a track, where the inter-sensor distance (520) may vary.
Figure 4:
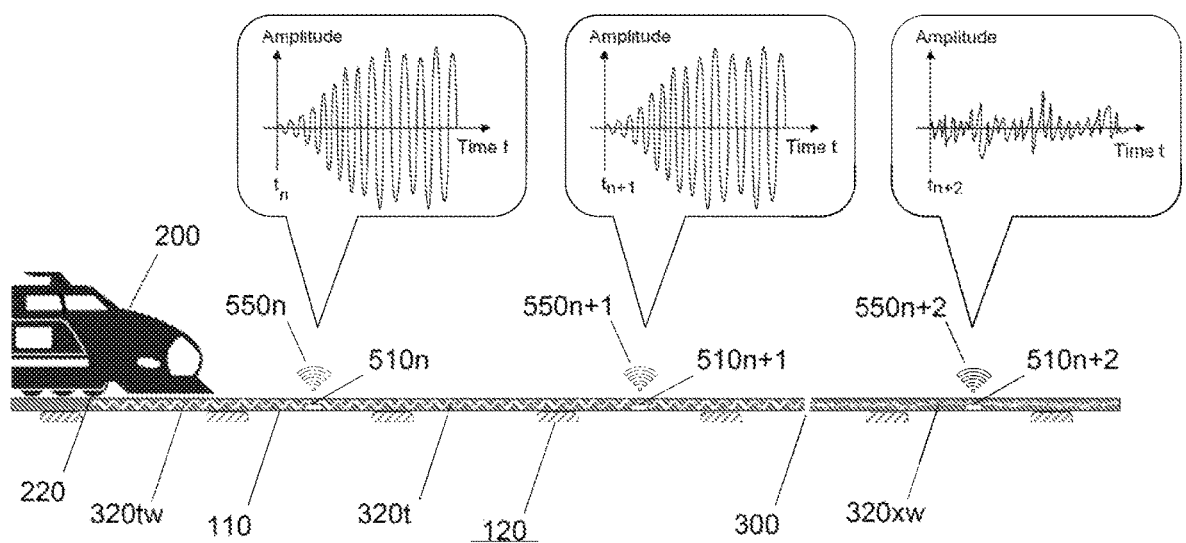
FIG. 4 is a schematic drawing illustrating the acoustic/seismic waves generated by the moving train, typically by the wheels of the train, travelling through the rails and sensed by the sensors as a function of time before the train passes the respective sensors. In case that the wave propagation medium, which would typically be the rail profile itself, between the moving train and a given line of sensors is intact and substantially uninterrupted, each of these sensors will sense a signal with a highly similar signature over time. Sensors located beyond a broken rail segment will sense a highly disturbed signal of the incoming train as the wave propagation medium between the travelling train and the sensor is more or less interrupted.
Figure 5:
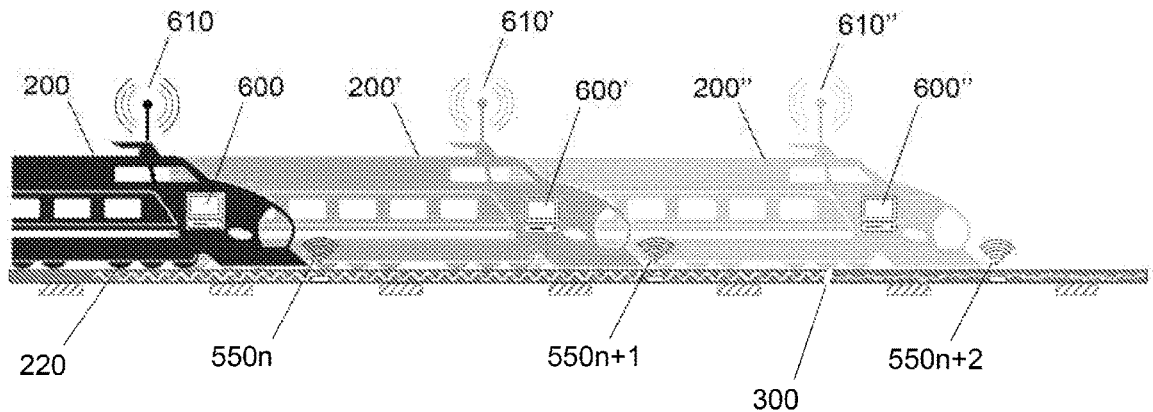
FIG. 5 is a schematic drawing illustrating the receiving and processing unit on-board a train in motion and reception of signals from track rail sensors successively as the train is proximal to a sensor.
Figures 6A, 6B, 6C, 6D:
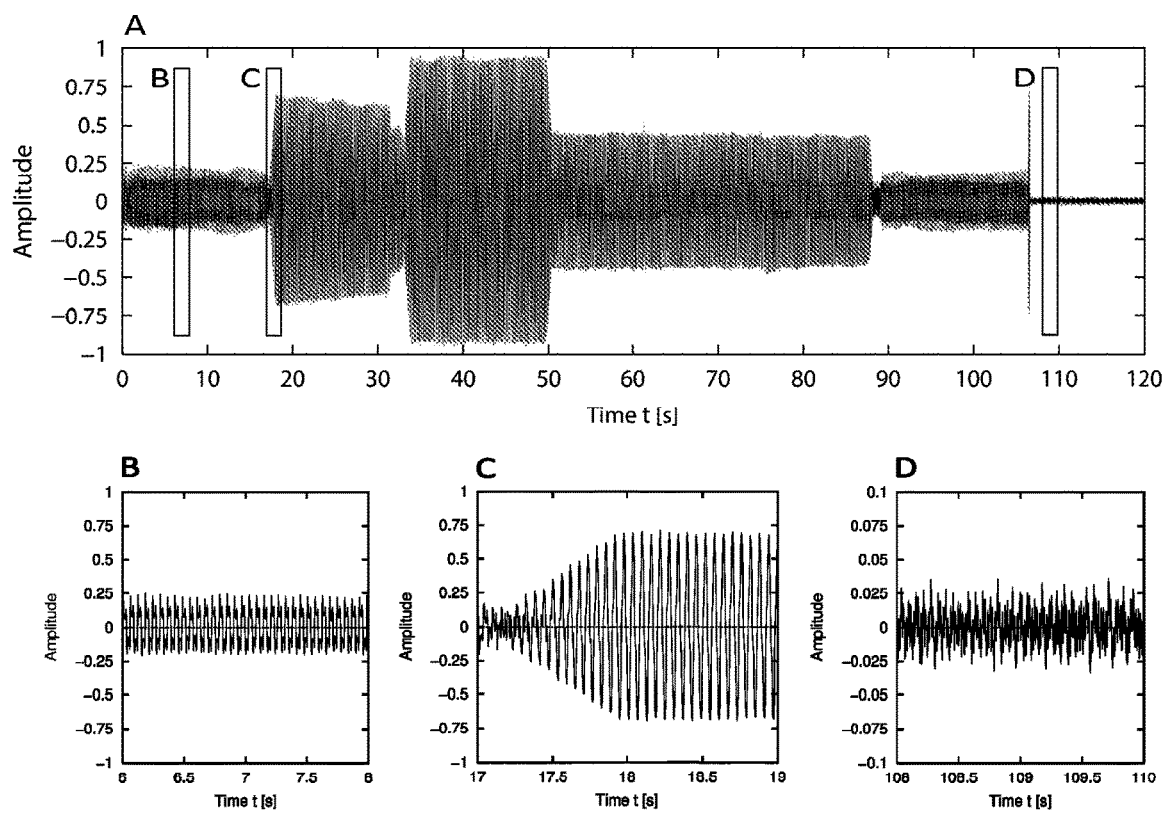
FIG. 6A illustrates a recording of the signal sensed by a seismic sensor directly attached to a rail and being created by an incoming train. In the present example, the signal versus time diagram clearly indicates various wave trains arriving at the respective sensor with various amplitude levels.
FIGS. 6B, 6C and 6D represent detail plots of the three marked windows in FIG. 6A.
Figure 7:
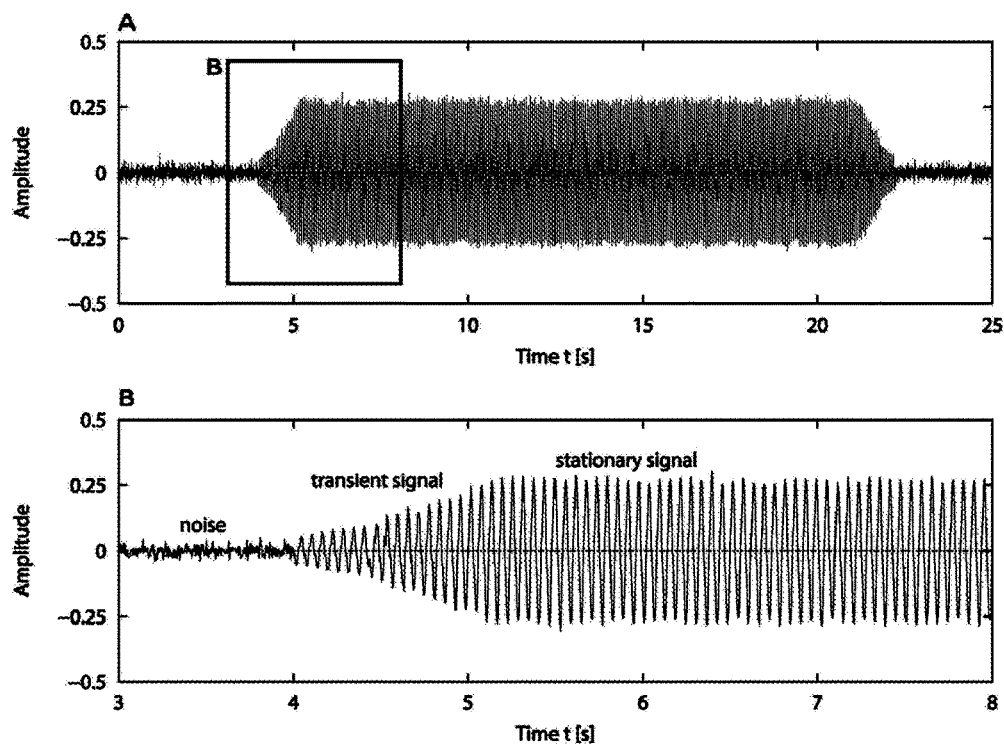
FIG. 7 provides an exemplary illustration of a signal sensed by a sensor employed in an embodiment of the invention, wherein the upper graph (FIG. 7A) displays the entire signal, and the lower graph (FIG. 7B) displays a selected portion of the signal on an expanded time scale. The selected portion of the signal represents the rectangle shown in the upper graph (marked as B in FIG. 7A) encompassing a time frame in which the signal rises from a noise level, through a transient signal part, up to a stationary signal level.

Once the train-induced accelerations or vibrations in the rail have arrived at the sensor unit and are sensed by the acceleration or vibration sensor, a portion of the sensed signal that is considered characteristic of a useful signal is recorded, preferably by data representing the sensed signal stored into a separate data file in a data storage. The data representing the sensed signal stored into the separate data file later establishes the basis for the correlation with data from neighboring sensor units. The decision to initiate a recording, herein also referred to as a signal data recording trigger, is made on basis of one or more of the following:

a) Using a measured signal-to-noise ratio (SNR) within a moving short time window:

The average amplitude level of all data points in a moving time window are continuously monitored. At times when no train-induced waveforms arrive at the sensor, the sensed signal output from the acceleration or vibration sensor of the sensor unit is considered a noise signal. A noise signal detector determines and stores the average amplitude level of the noise signal. As the train-induced waveforms arrive at the sensor, the average amplitude level of the sensed accelerations or vibrations increases and rises above the noise level, as illustrated in FIG. 7. A signal-to-noise ratio is computed as the ratio of the average amplitude level of the sensed accelerations or vibrations to the average amplitude level of the noise signal. A certain signal-to-noise ratio is set as threshold, and the recording of the sensed signal will be initiated (triggered) as soon as the set signal-to-noise ratio threshold is exceeded by the train-induced vibrations. The time window used is not too short in order to avoid false recordings triggered by perturbations close to the respective sensor units (e.g. induced by traffic or other ambient noise).

The trigger threshold using the signal-to-noise ratio can be set as a fixed threshold value based upon the noise level, i.e., trigger threshold (SNR)=3×noise level.

b) Short-time average/long-time average (STA/LTA) trigger:

The average amplitudes of all data points sensed in a short and a long time window, called short-time average (STA) and long-time average (LTA), respectively, are monitored and compared with each other; once the train-induced wavetrains arrive at the sensor unit, the STA will experience a sudden increase while the LTA will only be affected in minor way; the deviation between STA and LTA (sudden increase of the STA/LTA ratio) is used to trigger the recording of the sensed signal.

The trigger threshold using the STA/LTA ratio can be set as:

trigger threshold (STA/LTA)>1.2×(STA/LTA)$^{noise}$; i.e., 20% increase of the previous (STA/LTA) for noise.

c) Kurtosis of the transient signal:

The shape (tailedness) of the envelope of the steadily increasing sensed transient signal upon arrival of a train-induced wavetrain and the thereby increasing amplitudes of the sensed transient signal, is identified and applied to trigger the recording of the sensed signal.

d) Autocorrelation of the transient/stationary signal:

The single trace data sensed at each sensor is constantly auto-correlated (i.e., cross-correlated with itself at different points in time). In case of random noise and no train-induced wavetrains arriving at the sensor unit, the maximum auto-correlation coefficient (autocorr=1) only occurs at zero-lag, else it is zero.

Once the train-induced wavetrains arrive at the sensor unit, during the transient part of the signal which is characterized by steadily increasing amplitudes (see FIG. 7A), an increasing number of auto-correlation spikes will occur away from the zero-lag. When the signal becomes stationary, auto-correlating spikes of (more or less) constant amplitudes will emerge periodically (depending on the dominant period of the stationary sensed signal).

e) Amplitude variations of the stationary signal lower than a fixed threshold:

The average maximum amplitudes of successive data points within a certain time window are monitored and compared with each other; once the train-induced wavetrains arrive at the sensor unit, the variation of the maximum amplitudes (peaks) of the stationary part of the sensed signal (compare with FIG. 7) becomes minimal, which will trigger the recording of the sensed signal.

The trigger using the amplitude variations of the stationary part of the sensed signal can in an embodiment of the invention be set as:

trigger threshold (amplitude variations of stationary part)<0.05×average amplitude of sensed signal; i.e., variation smaller than 5% of the average amplitudes of the sensed signal.

FIG. 7 illustrates a time signal sensed by a sensor unit which indicates the arrival of the first wavetrain induced by an approaching train at distance. Random seismic noise can be observed before and after the train-induced signal.

As an example of a sensor element considered applicable for an embodiment of the present invention, reference is made to the models 4020 dual axis configuration and 4030 triaxial configuration accelerometers from Measurement Specialties Inc., a member of the TE Connectivity Ltd. Family of companies, which is of silicon MEMS type, providing DC Response and dual and triaxial output options, respectively, in respective ±2 g and ±6 g measurement ranges with a nominal 0-200 Hz bandwidth. For the model 4020, sensitivity is 1000 mV/g and residual noise over the passband is 600 microvolts RMS. For the model 4030, sensitivity is 333 mV/g and residual noise over the passband is 240 microvolts RMS. Accordingly, a sensor according to the invention employing the model 4020 dual axis configuration or the model 4030 triaxial configuration accelerometer is capable of a useful dynamic signal range of about 35 dB, which is considered suitable for implementation of the invention.

In the following is described a sanity check of a section of the rail track between two consecutive sensors.

Having a number N of sensors distributed along the track, the correlation coefficient matrix between the signals sensed at a first sensor $s_n$ and at a second sensor $s_{n+m}$, wherein n and m are integers, n can take any value, and m can take any value different from zero, is defined as:

$$Corr(s_n, s_{n+m}) = \frac{Cov(s_n, s_{n+m})}{\sigma_{s_n} \sigma_{s_{n+m}}}$$

where $\sigma_{s_n}$ and $\sigma_{s_{n+m}}$ are the standard deviations of the signals at the respective sensors pairs and $Cov(s_n, s_{n+m})$ is their covariance. The correlation coefficient is defined in the interval [−1 1].

Figure 8:
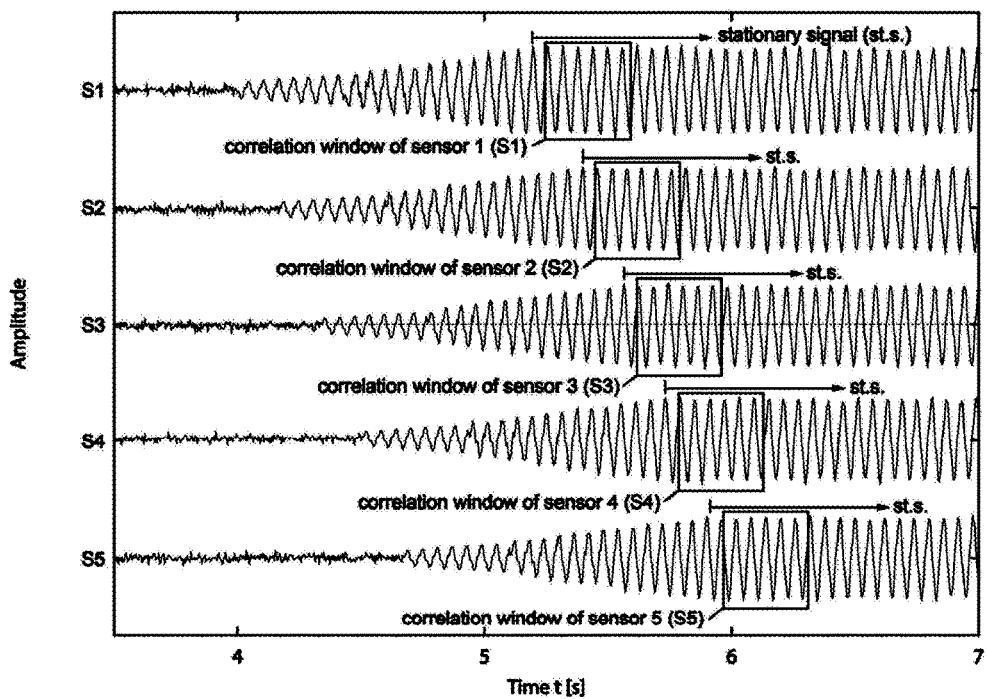
FIG. 8 provides an exemplary illustration of five time shifted signals as appearing when sensed, at an intact rail with no discontinuity at any point between the sensors, by five respective sensors employed in an embodiment of the invention, and, for each of the five illustrated signals, rectangles to indicate signal windows selected for sensor signal correlations.

FIG. 8 illustrates the recording of a signal generated by a instationary source moving in the direction of the sensors and thereby mimicking a train moving towards the sensors. The signal's wave propagation velocity is set to 6,000 m/s while the inter-sensor distance (520) is set to 1 km.

Figures 9, 10:
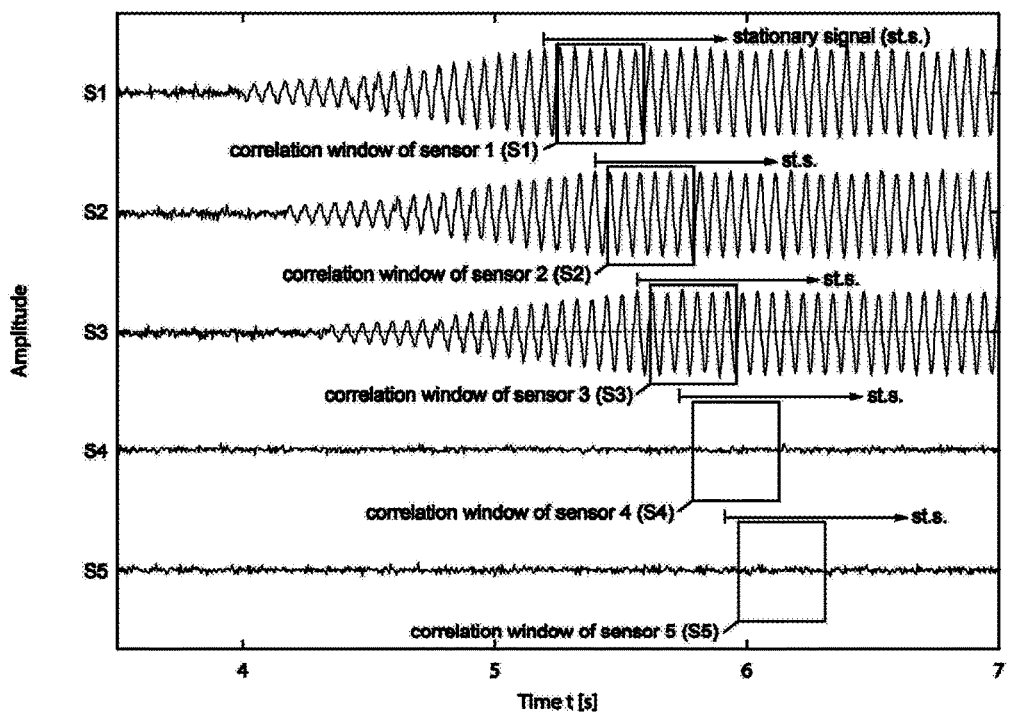
FIG. 9 provides an exemplary illustration of sensor signal correlations according to the invention for the signals in the selected windows of the five time shifted signals illustrated in FIG. 8.
FIG. 10 provides an exemplary illustration of five time shifted signals as appearing when sensed, at a rail with one discontinuity at one point between the sensors (i.e., between Sensor S3 and Sensor S4), by five respective sensors employed in an embodiment of the invention, and, for each of the five illustrated signals, rectangles to indicate signal windows selected for sensor signal correlations.

FIG. 9 shows the correlation matrix between the correlation windows of all five sensors. The correlation window is located in the stationary parts of the signals (st.s.). The correlation matrix demonstrates high cross correlation coefficients even between signals recorded at sensors with inter-sensor distances of 4 km.

Figures 11, 12:
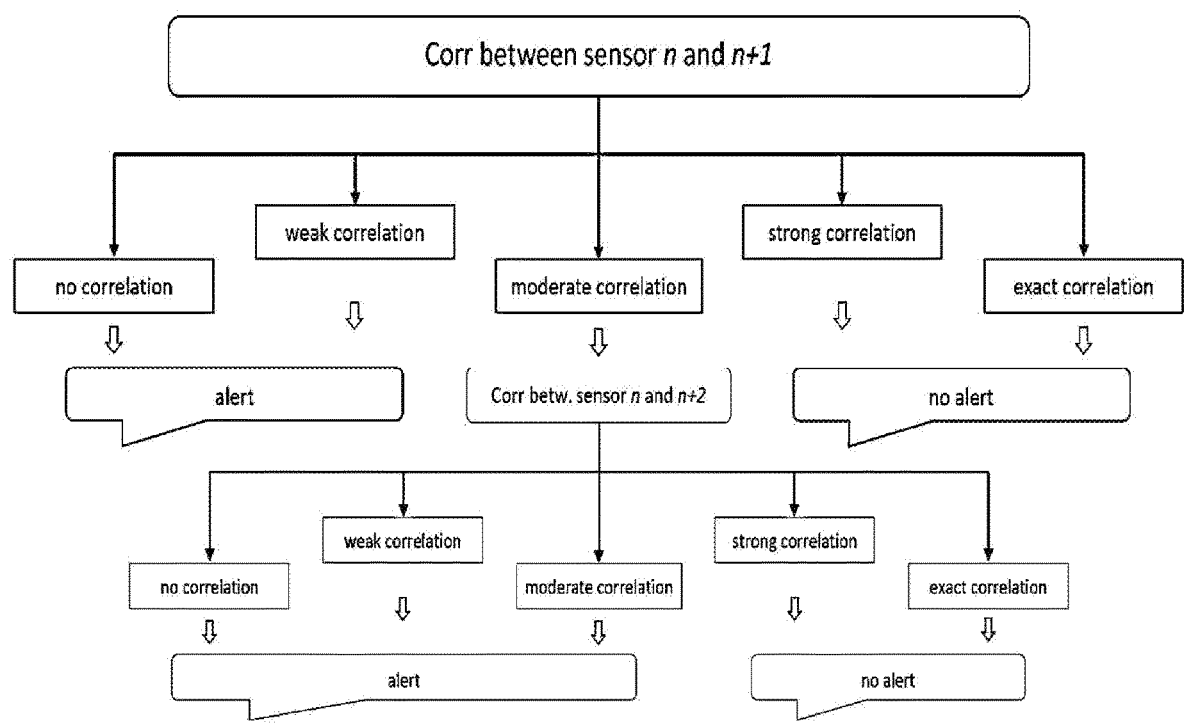
FIG. 11 provides an exemplary illustration of sensor signal correlations according to the invention for the signals in the selected windows of the five time shifted signals illustrated in FIG. 10.
FIG. 12 provides an exemplary flow chart illustration of a procedure of action based on thresholds for action defined by different cross-correlation coefficients resulting from correlation of signals from rail sensors.

FIG. 10 illustrates records of the synthetic signal at the eight sensors but with a broken segment inbetween sensors #3 ($s_3$) and #4 ($s_{3+1}$). Due to the break in the propagation medium, the waves generated by the introduced signal do not propagate beyond the breach point (depending on the width of the break), and the cross correlation coefficients between the sensors $s_3$ and $s_{3+1}$ located before and after the breach point, respectively, suddenly drop as it is indicated in the corresponding cross-correlation matrix, which is illustrated in FIG. 11.

The sensed signals that are recorded at consecutively located sensor units $s_n$, $s_{n+m}$ . . . and advantageously stored in separate data files that are picked up by the train while passing the respective sensor units, will be cross-correlated against each other, preferably using the herein described cross-correlation algorithm.

The sanity check of the rail track inbetween two sensor units $s_n$, $s_{n+m}$ will be based upon the cross-correlation coefficient between the sensed signals at the two sensor units $s_n$ and $s_{n+m}$. In the case that the cross-correlation coefficient is lower than a certain threshold, which in an embodiment of the invention is suggested set for Corr ($s_n$, $s_{n+m}$)=0.99, an alert message is sent to the TOCC to indicate the respective section of the rail track between sensor units $s_n$ and $s_{n+m}$ for a potential broken rail.

The sanity check of the rail track between sensor units $s_n$, $s_{n+m}$ can be verified/corroborated by cross-correlating the sensed signals of sensor units that are not directly neighboring each other, i.e., sensor units $s_{n-1}$ and $s_{n+m}$, sensor units $s_n$ and $s_{n+m+1}$, sensor units $s_{n+m}$ and $s_{n+m+2}$, etc.

The sanity check of the rail track between sensor units $s_n$, $s_{n+m}$ can be verified/corroborated by cross-correlating the signals generated by consecutive trains and sensed at the vary same sensor units $s_n$, $s_{n+m}$.

In the following, different implementations all covered by the invention will be exemplified.

Using statistics terminology, the cross-correlation coefficients resulting from correlation of signals from rail sensors are advantageously distinguished into:
1) "exact" correlation (Corr. value=1),
2) "strong" correlation (Corr. value>0.8 and <1),
3) "medium" correlation (Corr. value=in range 0.5-0.8),
4) "weak" correlation (Corr. value<0.5 and >0), and
5) "no" correlation (Corr. value=0),
though the values for these thresholds for action could show some variations from one reference to another reference.

In a first example, now referred to as solution 1, thresholds for action are advantageously applied as follows:
a) "exact" and "strong" correlation=>no alert message is sent
b) "medium" correlation=>set flag ("warning"), and perform double-check with neighboring sensors (e.g. sensors $s_n$ and $s_{n+2}$) before an alert message is sent
c) "weak" and "no" correlation=>alert message is sent In a second example, now referred to as solution 2: an alert message trigger logic comprised in an apparatus or method according to the invention is implementing at least part of the procedure described in FIG. 12.

According to a first aspect of the invention, an electronic rail monitoring sensor unit for a railroad rail condition monitoring system is proposed, the rail sensor comprising a seismic sensor means adapted to sense acoustic energy in the rail, a coupling means for keeping the sensor unit attached to the rail and the seismic sensor means acoustically coupled to the rail, a signal data recording means having a clock and in communication with the seismic sensor means, and adapted to make a record of signal data representing acoustic energy sensed by the seismic sensor means as a function of time, a short-range wireless data communication means in communication with the signal data recording means and adapted to establish a wireless data link to another short-range wireless data communication means located on-board a train for making a transfer of the record of signal data to another second wireless data communication means, a controller means in communication with the seismic sensor means, the signal data recording means, and the first wireless data communication means, and adapted to identify from acoustic energy sensed by seismic sensor means, an acoustic energy signature of a distant train in motion on the rail, and, in response thereto, to activate the signal data recording means to make the record of signal data and to activate the first wireless data communication means to establish the wireless data link to the second wireless data communication means when within communication range and to make a transfer of the record of signal data to the second wireless data communication means.

An embodiment of the electronic rail monitoring sensor unit according to the first aspect above is also proposed, wherein the clock is a real time clock, and wherein the signal data recording means is adapted to make the record of signal data representing acoustic energy sensed by the seismic sensor means as a function of real time.

According to a second aspect of the invention, an electronic rail monitoring signal data receiver and processing arrangement for a railroad rail condition monitoring system is proposed, the receiver and processing arrangement being adapted to be installed and to operate on-board a train in motion and comprising a data storage means adapted to store a plurality of records of signal data representing acoustic energy in the rail as a function of time, a short-range wireless data communication means in communication with the data storage means and adapted to establish, when within wireless communication range another short-range wireless data communication means of a rail monitoring sensor unit attached and coupled to the rail, a wireless data link for receiving a transfer of a record of signal data from the another short-range wireless data communication means and to forward the received transfer of record data for storage in the data storage means with information for locating the respective rail monitoring sensor unit, and a data processing means adapted to receive the plurality of records of signal data representing acoustic energy in the rail as a function of time at respective ones of the rail monitoring sensor unit, to analyse, immediately after each receiving of a transfer of a record of signal data, the signal data to determine signal data representing acoustic energy in the rail generated by a train in motion on the rail distant from the respective sensor unit and propagated thereto but not to an adjacently located sensor unit, and to output an indication of a propagation discrepancy as an indication of a rail discontinuity.

An embodiment of the electronic rail monitoring signal data receiver and processing arrangement according to the second aspect above is also proposed, comprising a clock, and wherein the data processing means is adapted to analyse the received transfer of record of signal data using time as a parameter for analysis.

According to a third aspect of the invention, an electronic railroad rail condition monitoring system for providing an indication of a rail discontinuity, such as a rail break, is proposed, comprising a plurality of the electronic rail monitoring sensor unit according to the first aspect above attached to the rail in a spaced relationship, and at least one of the electronic rail monitoring signal data receiver and processing arrangement according to the second aspect above installed to operate on-board a train assigned to operate on the railroad.

The present invention is easily adapted for application at different railways from the fact that railway tracks generally consist of standardized components and standardized installation means. This especially applies to the rails which are standardized steel profiles supported by standardized sleepers/crossties, which are typically precast reinforced concrete sleepers/crossties. In respect of the present invention, the entire rail-sleeper system can be considered as a stable system that is not undergoing significant changes, e.g. in terms of stiffness or mass variations, over a period of time of reasonable length.

The invention claimed is:

1. A railway track condition monitoring system for detecting a partial or complete disruption of a rail of the railway track, comprising:
   a plurality of sensors installed on a rail of the track and spaced by a predetermined distance from each other, the sensors having respective signal acquisition and recording means for the acquisition and recording of an acoustic signal being generated by an approaching train and propagated by the rail or by a ground carrying the rail;
   a signal transfer means for the transfer of an acquired and recorded signal to the passing train by wireless transfer at the time of passing of the train in proximity to sensors;
   a signal analyzing means for analysing transferred ones of the acquired and recorded signal on-board the passing train; and
   means adapted to cross-correlate the signals from a first sensor ($s_n$) and an adjacent second sensor ($s_{n+m}$), where the first sensor and the second sensor are adjacent to one another on the same rail, and detect the partial or complete disruption of said rail of the railway track.

2. The rail condition monitoring system of claim 1, wherein the installed sensors are adapted to be stimulated by an acoustic stimulation passively generated by the approaching train collecting the data.

3. The rail condition monitoring system of claim 1, wherein the installed sensors comprise means for recording the signal for a given programmed time period upon the signal exceeding a predefined noise level.

4. The rail condition monitoring system of claim 1, wherein the signal acquisition and recording means is adapted to identify a start of the signal and to record the start of the signal, and the signal analyzing means is adapted to analyse a recorded start of the signal to derive therefrom rail breakage information indicating a rail discontinuity.

5. The rail condition monitoring system according to claim 1, further comprising:
   means adapted to distinguish cross-correlation coefficients obtained into
   a) "exact" correlation for Corr. value=1,
   b) "strong" correlation for Corr. value>0.8,
   c) "medium" correlation for Corr. value=0.5-0.8,
   d) "weak" correlation for Corr. value<0.5, and
   e) "no" correlation for Corr. value=0; and
   means responsive to said distinguished cross-correlation coefficients and adapted so to not send an alert message in response to "exact" or "strong" correlation, to perform double-check with neighboring sensors before an alert message is sent in response to "medium" correlation, and to send an alert message in response to "weak" or "no" correlation.

6. The rail condition monitoring system of claim 2, wherein the installed sensors comprise means for recording the signal for a given programmed time period upon the signal exceeding predefined noise level.

7. The rail condition monitoring system of claim 2, wherein signal acquisition and recording means is adapted to identify a start of the signal and to record the start of the signal, and the signal analyzing means is adapted to analyse a recorded start of the signal to derive therefrom rail breakage information indicating a rail discontinuity.

8. The rail condition monitoring system according to claim 2, comprising:
   means adapted to distinguish cross-correlation coefficients obtained into
   a) "exact" correlation for Corr. value=1,
   b) "strong" correlation for Corr. value>0.8,
   c) "medium" correlation for Corr. value=0.5-0.8,
   d) "weak" correlation for Corr. value<0.5, and
   e) "no" correlation for Corr. value=0; and
   means responsive to said distinguished cross-correlation coefficients and adapted so to not send an alert message in response to "exact" or "strong" correlation, to perform double-check with neighboring sensors before an alert message is sent in response to "medium" correlation, and to send an alert message in response to "weak" or "no" correlation.

9. The rail condition monitoring system according to claim 3, comprising:
   means adapted to distinguish cross-correlation coefficients obtained into
   a) "exact" correlation for Corr. value=1,
   b) "strong" correlation for Corr. value>0.8,
   c) "medium" correlation for Corr. value=0.5-0.8,
   d) "weak" correlation for Corr. value<0.5, and
   e) "no" correlation for Corr. value=0; and
   means responsive to said distinguished cross-correlation coefficients and adapted so to not send an alert message in response to "exact" or "strong" correlation, to perform double-check with neighboring sensors before an alert message is sent in response to "medium" correlation, and to send an alert message in response to "weak" or "no" correlation.

10. The rail condition monitoring system according to claim 4, comprising:
    means adapted to distinguish cross-correlation coefficients obtained into
    a) "exact" correlation for Corr. value=1,
    b) "strong" correlation for Corr. value>0.8,
    c) "medium" correlation for Corr. value=0.5-0.8,
    d) "weak" correlation for Corr. value<0.5, and
    e) "no" correlation for Corr. value=0; and
    means responsive to said distinguished cross-correlation coefficients and adapted so to not send an alert message in response to "exact" or "strong" correlation, to perform double-check with neighboring sensors before an alert message is sent in response to "medium" correlation, and to send an alert message in response to "weak" or "no" correlation.

\* \* \* \* \*